United States Patent [19]
Ueda et al.

[11] Patent Number: 5,564,029
[45] Date of Patent: Oct. 8, 1996

[54] PIPELINE PROCESSOR WHICH AVOIDS RESOURCE CONFLICTS

[75] Inventors: Katsuhiko Ueda, Sakai; Toshihiro Ishikawa, Yokohama; Mikio Sakakihara, Ootsu, all of Japan

[73] Assignee: Matsushita Electric Industrial Co., Ltd., Osaka, Japan

[21] Appl. No.: 328,620

[22] Filed: Oct. 25, 1994

Related U.S. Application Data

[63] Continuation of Ser. No. 74,033, Jun. 4, 1993, abandoned.

[30] Foreign Application Priority Data

Jun. 8, 1992 [JP] Japan .................. 4-147248

[51] Int. Cl.$^6$ .................................. G06F 9/06
[52] U.S. Cl. ................... 395/375; 364/231.8; 364/239.4
[58] Field of Search ............................. 395/375

[56] References Cited

U.S. PATENT DOCUMENTS

| | | | |
|---|---|---|---|
| 4,309,755 | 1/1982 | Lanty ..................... | 395/275 |
| 5,060,145 | 10/1991 | Scheuneman et al. ................ | 395/425 |
| 5,125,083 | 6/1992 | Fite et al. .................. | 395/375 |
| 5,148,529 | 9/1992 | Ueda et al. ............... | 395/375 |
| 5,222,223 | 6/1993 | Webb, Jr. et al. ............ | 395/425 |

OTHER PUBLICATIONS

"The Major Hurdle of Pipelining–Pipelining Hazards", Computer Architecture–A Quantitative Approach, pp. 257–278, 1990, Morgan Kaufmann Publishers, Inc.

Sohi, "Instruction Issue Logic for High–Performance Interruptible, Multiple Functional Unit, Pipelined Computers", IEEE Trans. Computers vol. 39, No. 3, Mar. 1990, pp. 349–359.

Dwyer, "A Fast Instruction Dispatch Unit for Multiple and Out–of Seqence–Issuances", EE–CEG–87–15 pp. pp. 1–11 and FIG.S 1–9.

Primary Examiner—Krisna Lim
Attorney, Agent, or Firm—Price, Gess & Ubell

[57] ABSTRACT

The present invention discloses a pipeline processor system comprising a pipeline processor and a memory device, wherein the memory device is comprised of a memory unit for holding data and/or an instruction as well as being accessed to implement memory read operation or memory write operation in a clock cycle; and a data latch unit for latching data to be written into the memory unit, while the pipeline processor is comprised of an instruction detection unit for detecting from fetched instructions a first predetermined instruction which directs the latch of the data as well as a second predetermined instruction which directs write of the data at the data latch means into the memory means; and a latch control unit for controlling to latch operation results of the first predetermined instruction to the data latch unit when the predetermined instruction is detected by the instruction detection unit as well as controlling to write the data at the data latch unit into the memory unit when the second predetermined instruction is detected.

The first predetermined instruction includes operand fetch from the memory unit replaced with the latch of the operand, the operand fetch encompassing two memory accesses having been planned in a clock cycle together with the memory write operation; and the second predetermined instruction includes execution of an instruction and the write of the data at the data latch means into the memory means, the instruction placing after the first predetermined instruction and excluding its own memory access.

17 Claims, 16 Drawing Sheets

FIG. 3(a) general instruction

| OP | 00 | operand 1,2 | 000 | pointer |
|---|---|---|---|---|
| 31  25 24 | 23 22 | | 14 13 12 11 | 10  0 |

FIG. 3(b) first predetermined instruction

| OP | 01 | operand 1,2 | 001 | pointer |
|---|---|---|---|---|
| 31  25 24 | 23 22 | | 14 13 12 11 | 10  0 |

FIG. 3(c) second predetermined instruction

| OP | 01 | operand 1,2 | 010 | pointer |
|---|---|---|---|---|
| 31  25 24 | 23 22 | | 13 12 11 | 10  0 |

00: general instruction
01: latch operation

000: bus→memory (a)
001: bus→latch (b)
010: latch→memory (c)

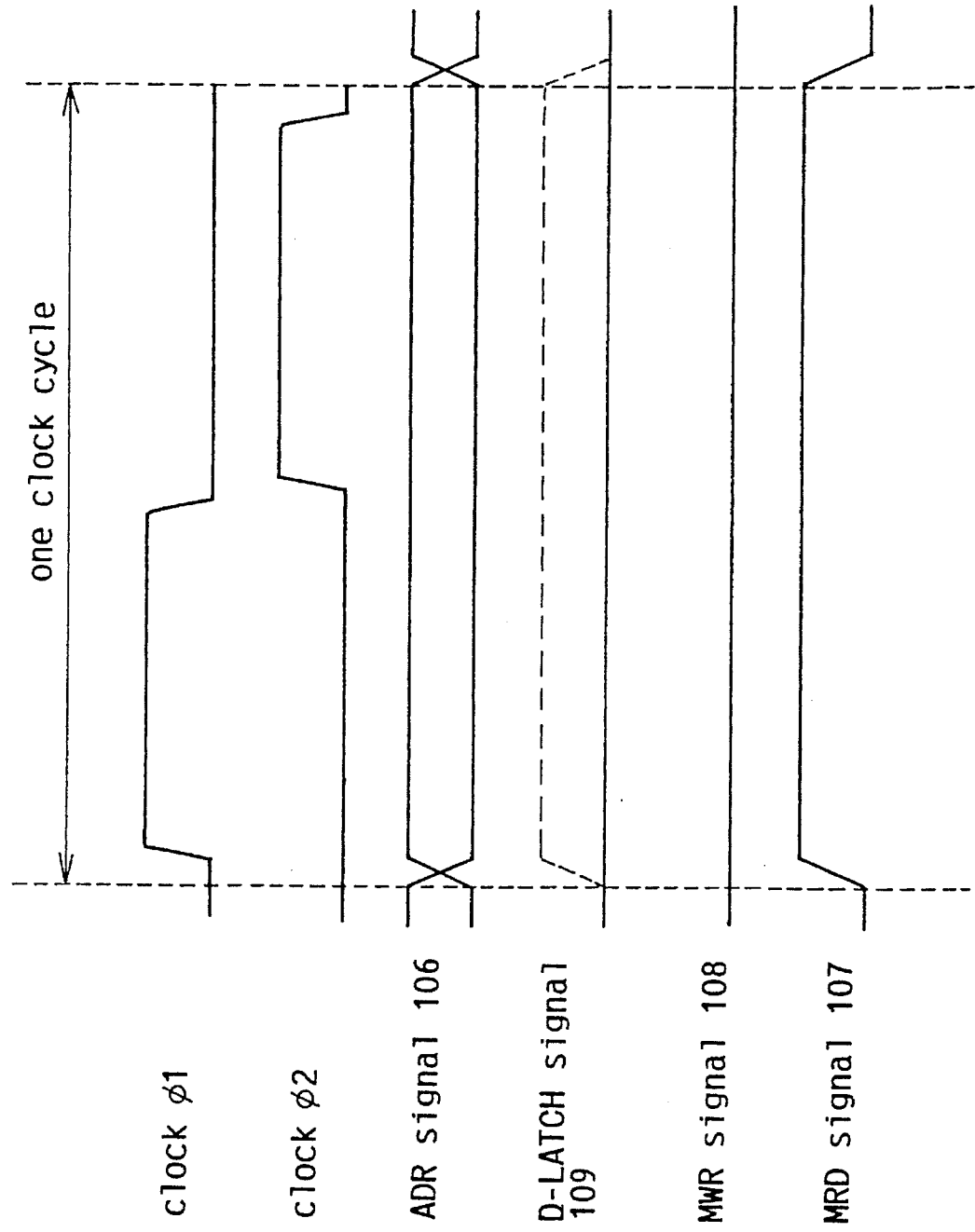

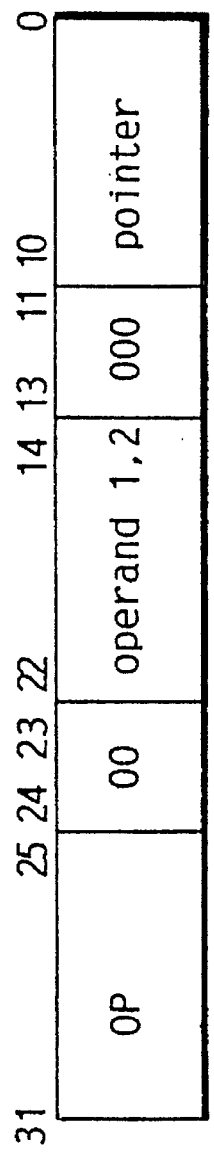
FIG. 11(a) general instruction
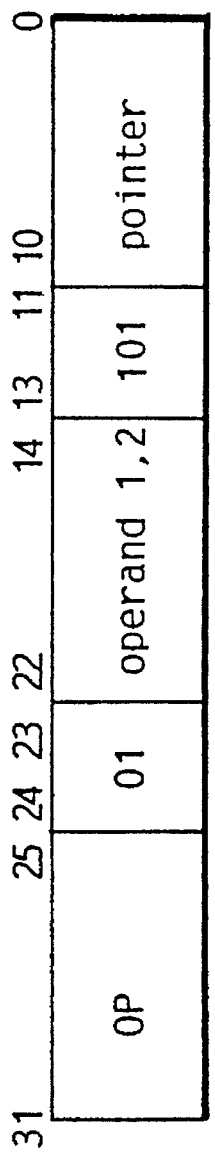
FIG. 11(b) third predetermined instruction
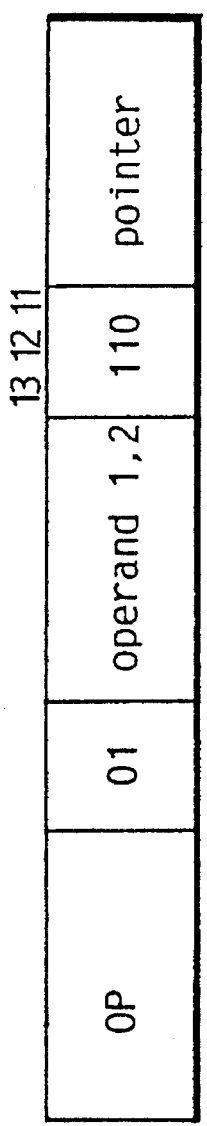
FIG. 11(c) fourth predetermined instruction
00: general instruction
01: latch operation
000: bus→memory (a)
101: latch→memory (b)
110: bus→latch (c)

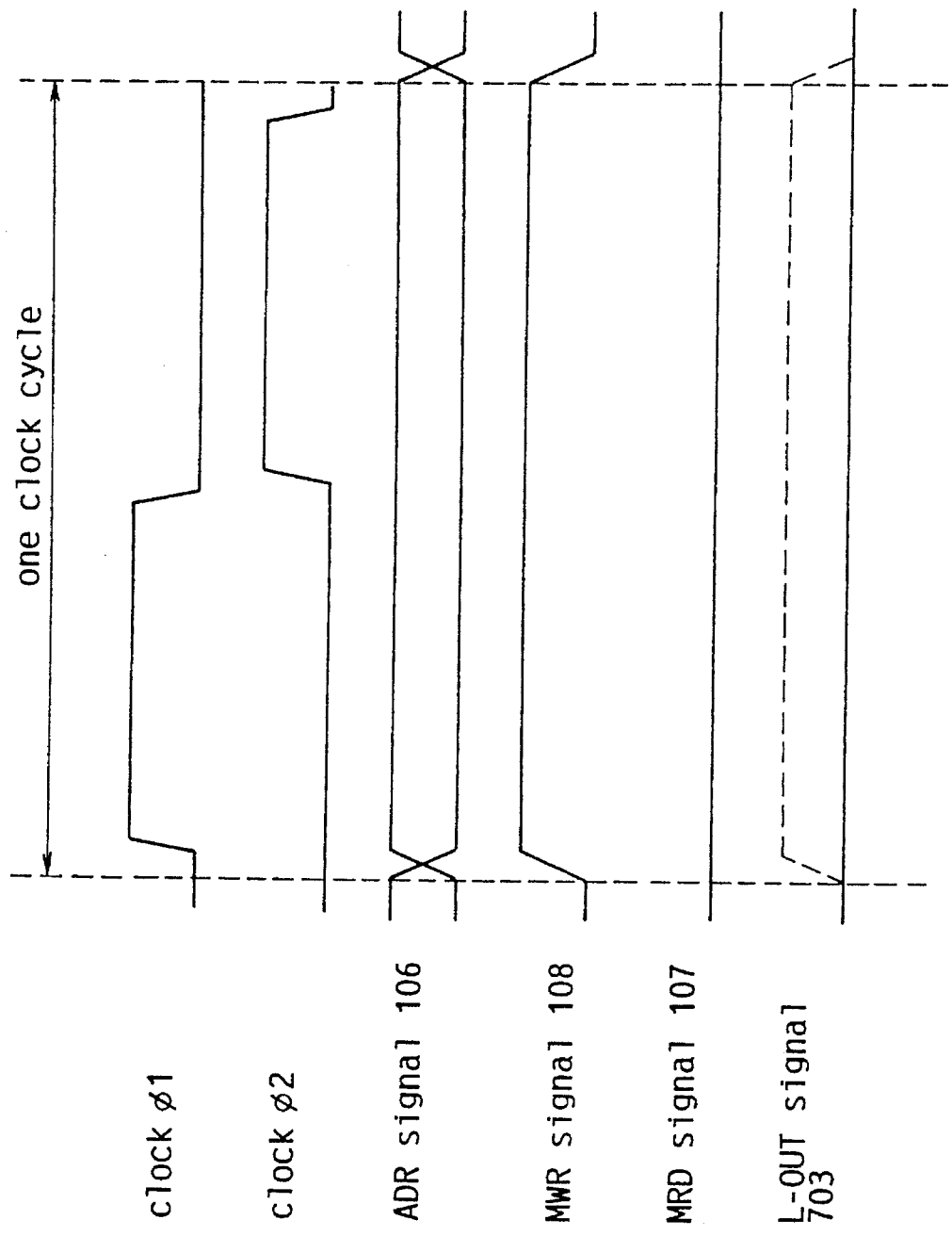

PIPELINE PROCESSOR WHICH AVOIDS RESOURCE CONFLICTS

This is a continuation of application Ser. No. 08/074,033, filed on Jun. 4, 1993, now abandoned.

BACKGROUND OF THE INVENTION (1) Field of the Invention

The present invention relates to a pipeline processor system including a data memory device and a pipeline processor.

(2) Description of the Related Art

A pipeline architecture improves efficiency of a microprocessor by permitting a number of sequential instructions to be in various execution stages simultaneously.

In the pipeline architecture, however, hazards arise from resource conflicts when the processor cannot support memory access instructions in simultaneous overlapped execution; and they reduce the performance from the ideal speedup gained by pipelining.

For example, it is assumed that a processor implements a four-stage pipeline for instruction execution. The four stage are: instruction fetch, decode/operand fetch, execute, and write-back. A resource conflict possibly occurs when the processor attempts to execute an instruction in decode/operand fetch stage while another instruction in write-back stage is in progress.

Thus, resource conflicts occur when the processor wants to perform plural memory accesses in single clock cycle. To be concrete for the above four-stage pipeline processor, hazards possibly occur in three combination of instructions in simultaneous overlapped execution: 1) an instruction in the instruction fetch stage and an instruction in the operand fetch stage, 2) an instruction in the instruction fetch stage and an instruction in the write-back stage, and 3) an instruction in the operand fetch stage and an instruction in the write-back stage. The hazards cause stalls in the pipeline processor.

The stall in the processor caused by the overlapped execution of the first and the second combinations of instructions can be prevented by duplication of resources. If the processor employs separate instruction and data memories, two memory accesses can be performed in a clock cycle.

The stall caused by the third combination, however, requires that some instructions be allowed to proceed, while others are delayed. To be precise, an early instruction in its write/back stage is allowed to proceed, while an instruction in its decode/operand fetch stage is delayed. In this case, the pipeline will stall an instruction in the decode/operand fetch stage until the required unit is available ("Computer architecture A Quantitative Approach, pp. 257–278, 1998, Morgan Kaufmann Publishers, Inc.")

Thus, the stall caused by the third combination cannot be prevented even by the duplication of resources; and the stall in the pipeline degrades the pipeline performance from the ideal one. To be precise for the above four-stage pipeline processor, the pipeline must stall for one clock cycle when the resource conflicts happen. Consequently, the execution cycle becomes five clock cycles including one clock cycle pipeline delay, though it has four clock cycles without the resource conflicts.

SUMMARY OF THE INVENTION

It is a primary object of the present invention to provide a pipeline processor system comprising a data memory device and a pipeline processor, the pipeline processor system preventing degrade of the pipeline performance by resolving resource conflicts.

The above object may be fulfilled by a pipeline processor system comprising a memory device for holding data and/or instructions as well as latching data to get accessed concurrently with one of memory read operation and memory write operation; instruction detection unit for detecting from fetched instructions a first predetermined instruction which directs the latch of the data as well as a second predetermined instruction which directs output of the data which was latched; and latch control unit for controlling to do the latch when the first predetermined instruction is detected as well as controlling to do the output when the second predetermined instruction is detected.

The memory device may hold only the data while an instruction memory device being independent from the memory device holds the instructions.

The first predetermined instruction may include one of two memory accesses replaced with the latch, the two memory accesses having been planned in one clock cycle; and the second predetermined instruction may include execution of an instruction and the output, the instruction placing after the first predetermined instruction and excluding its own memory access.

The first predetermined instruction may include execution of an instruction and the output, the instruction placing after the first predetermined instruction and excluding its own memory access; and the second predetermined instruction may include one of two memory accesses replaced with the latch, the two memory accesses having been planned in one clock cycle.

Also, the above object may be fulfilled by a pipeline processor system comprising a pipeline processor and a memory device, wherein the memory device is comprised of memory unit for holding data and/or an instruction as well as being accessed to implement one of memory read operation and memory write operation in a clock cycle; and data latch unit for latching data, the data to be written into the memory unit, while the pipeline processor is comprised of instruction detection unit for detecting from fetched instructions a first predetermined instruction which directs the latch of the data as well as a second predetermined instruction which directs write of the data at the data latch unit into the memory unit; and latch control unit for controlling to latch operation results of the first predetermined instruction to the data latch unit when the predetermined instruction is detected by the instruction detection unit as well as controlling to write the data at the data latch unit into the memory unit when the second predetermined instruction is detected.

The first predetermined instruction may include operand fetch from the memory unit replaced with the latch of the operand, the operand fetch encompassing two memory accesses having been planned in a clock cycle together with the memory write operation; and the second predetermined instruction may includes execution of an instruction and the write of the data at the data latch unit into the memory unit, the instruction placing after the first predetermined instruction and excluding its own memory access.

The memory device may be connected to the pipeline processor via a data bus; the data latch unit may be connected so that data are inputted from the data bus and are outputted to the memory unit; and the latch control unit may control to read the data from the memory unit during a memory read cycle as well as latch the data at the data bus to the data latch unit during first half of the same memory read cycle.

The pipeline processor may include an instruction fetch stage, a decode/operand fetch stage, an execute stage, and a write-back stage; the first predetermined instruction may direct the latch of the data instead of writing the data into the memory unit in its write-back stage when the memory write operation and operand fetch from the memory unit are planned in a clock cycle; the second predetermined instruction may include execution of an instruction and the write of the data from the data latch unit into the memory unit, the instruction excluding its own write back stage; and the latch control unit may control to latch operation results of the first predetermined instruction to the data latch unit during its write back stage as well as controls to write the data at the data latch unit into the memory unit during the write back stage of the second predetermined instruction.

Both the first predetermined instruction and the second predetermined instruction may have a unique bit pattern formed at predetermined location in its machine language instruction; and the instruction detection unit detects the first predetermined instruction and the second predetermined instruction by decoding the bit pattern at the predetermined location in the machine language instruction.

The second predetermined instruction may have in its machine language instruction a predetermined field for indicating a destination address of operation results of the first predetermined instruction; and the instruction detection unit may obtain the destination address by decoding the predetermined field in the machine language instruction when detecting the second predetermined instruction.

Further, the above object may be fulfilled by a pipeline processor system comprising a pipeline processor and a memory device for holding data applied to the processor, wherein the memory device is comprised of memory unit for holding data and/or an instruction as well as being accessed to implement one of memory read operation and memory write operation in a clock cycle; and data latch unit for latching data to be read from the memory unit, while the pipeline processor is comprised of instruction detection unit for detecting from fetched instructions a first predetermined instruction which directs the latch of the data to the data latch unit as well as a second predetermined instruction which directs output of the data which was latched to the data latch unit; and latch control unit for controlling to latch data from the memory unit to the data latch unit when the first predetermined instruction is detected by the instruction detection unit, the data locating at an address designated by the detected instruction as well as controlling to read the data at the data latch unit when the second predetermined instruction is detected.

The first predetermined instruction may include execution of an instruction and the latch of the data from the memory unit to the data latch unit, the instruction placing before the second predetermined instruction and excluding its own operand fetch; while the second predetermined instruction may include the memory read operation replaced with the read of the latch unit, the memory read operation encompassing two memory accesses having been planned in a clock cycle together with the memory write operation.

The memory device may be connected to the pipeline processor via a data bus; the data latch unit may be connected so that data are inputted from the data bus and are outputted to the memory unit; and the latch control unit may control to read the data from the memory unit during a memory read cycle as well as latch the data at the data bus to the data latch unit during first half of the same memory read cycle.

The pipeline processor may include an instruction fetch stage, a decode/operand fetch stage, an execute stage, and a write-back stage; the first predetermined instruction may direct the latch of the data to the data latch unit during the decode/operand fetch stage of an instruction, the instruction excluding its own operand fetch, while the second predetermined instruction directs the output of the data from the data latch unit during its decode/operand fetch stage when operand fetch of another instruction and write back of the second predetermined instruction are planned in a clock cycle; and the latch control unit may control to do the latch to the data latch unit during the decode/operand fetch stage of the first predetermined instruction as well as controls to do the read from the data latch unit during the decode/operand fetch stage of the second predetermined instruction.

Both the first predetermined instruction and the second predetermined instruction may have a unique bit pattern formed at predetermined location in its machine language instruction; and the instruction detection unit detects the first predetermined instruction and the second predetermined instruction by decoding the bit pattern at the predetermined location in the machine language instruction.

The second predetermined instruction may have in its machine language instruction a predetermined field for indicating a destination address of operation results of the first predetermined instruction; and the instruction detection unit may obtain the destination address by decoding the predetermined field in the machine language instruction when detecting the second predetermined instruction.

In this construction, the memory device applied to the pipeline processor system of the present invention temporarily holds data to be memory accessed concurrently with either of the memory read operation or the memory write operation. The pipeline processor has the latch control unit control the latch of the data to inside of the memory device when the first predetermined instruction is detected as well as control the output of the data having been latched when the second predetermined instruction is detected.

According to the pipeline processor system of the present invention, the speedup performance obtained by pipelining can be protected from the hazards. That is, the stall in the pipeline conventionally caused by two memory accesses (memory read instruction and memory write instruction) in a clock cycle will be prevented by having the latch control unit latch the data for the memory write instruction. Concurrently, the data for the memory read instruction are read from the data memory. Subsequently, another instruction is employed to write the data which was latched to the data latch into the data memory.

The stall in the pipeline conventionally caused by two memory accesses (memory read instruction and memory write instruction) in a clock cycle will be prevented by having the latch control unit latch the data for the memory read instruction. Concurrently, the data for the memory write instruction are written into the data memory. Subsequently, another instruction is employed to read the data from the data latch.

BRIEF DESCRIPTION OF THE DRAWINGS

These and other objects, advantages and features of the invention will become apparent from the following description thereof taken in conjunction with the accompanying drawings which illustrate a specific embodiment of the invention. in the drawings:

FIG. 3(a), FIG. 3(b), and FIG. 3(c) show construction of an instruction represented by bits, the instruction applied to the pipeline processor in the first embodiment;

FIG. 4 shows the operation timing of operand fetch (OF) in the first embodiment;

FIG. 11(a), FIG. 11(b), and FIG. 11(c) show construction of an instruction represented by bits, the instruction applied to the pipeline processor in the second embodiment;

FIG. 12 shows the operation timing of operand fetch (OF) in the second embodiment;

DESCRIPTION OF THE PREFERRED EMBODIMENTS

Embodiment 1

Figure 1:
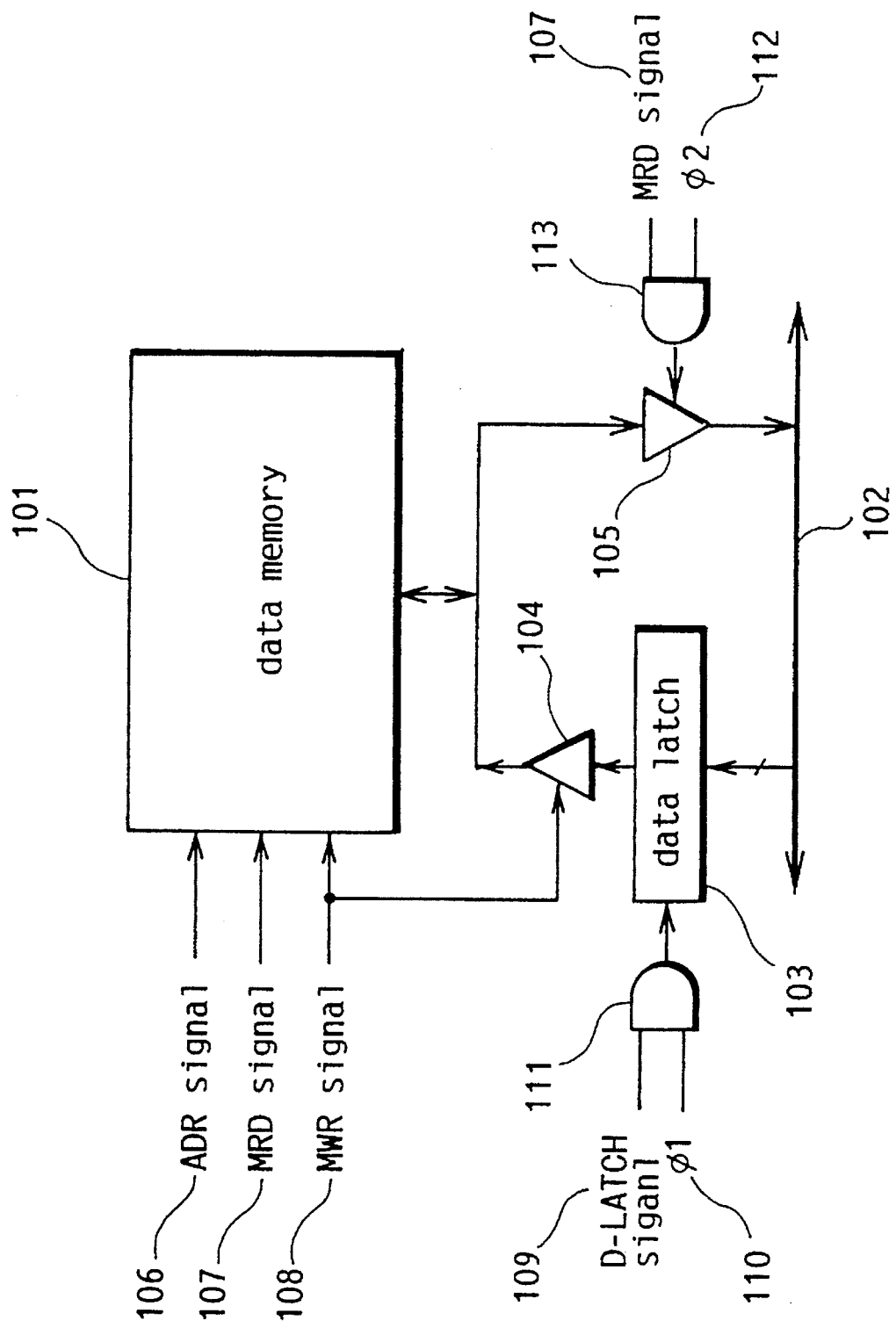
FIG. 1 is a block diagram depicting construction of a memory device in a first embodiment of the present invention.

Construction of a data memory device employed by a pipeline processor will be described hereunder with reference to FIG. 1.

A data memory 101 implements either a memory read mode or a memory write mode in a clock cycle.

A data bus 102 is a collection of wires through which data are transmitted from one component of the pipeline processor to another.

A data latch 103 temporarily holds data received via the data bus 102.

A 3-state buffer 104 receives data from the data latch 103 and controls the transfer of the data to the data memory 101.

A 3-state buffer 105 receives data from the data memory 101 and controls the transfer of the data to the data bus 102.

An AND gate 111 computes the AND of a write data latch signal 109 with a clock $\phi 1$; and provides a data latch signal to the data latch 103.

An AND gate 113 computes the AND of a memory read signal 107 with a clock $\phi 2$; and provides an output control signal to the buffer 105.

Control signals employed by the pipeline processor will be described.

An address (ADR) signal 106 indicates location of the data in the data memory 101.

A memory read (MRD) signal 107 controls the memory read operation.

A memory write (MWR) signal 108 controls the memory write operation.

The write data latch signal 109 (D-LATCH) controls the operation of the data latch 103.

A clock 110 ($\phi 1$) and a clock 112 ($\phi 2$) pace the work of the data memory 101, the clock $\phi 1$ and the clock $\phi 2$ having the reverse phase of each other.

Figure 2:
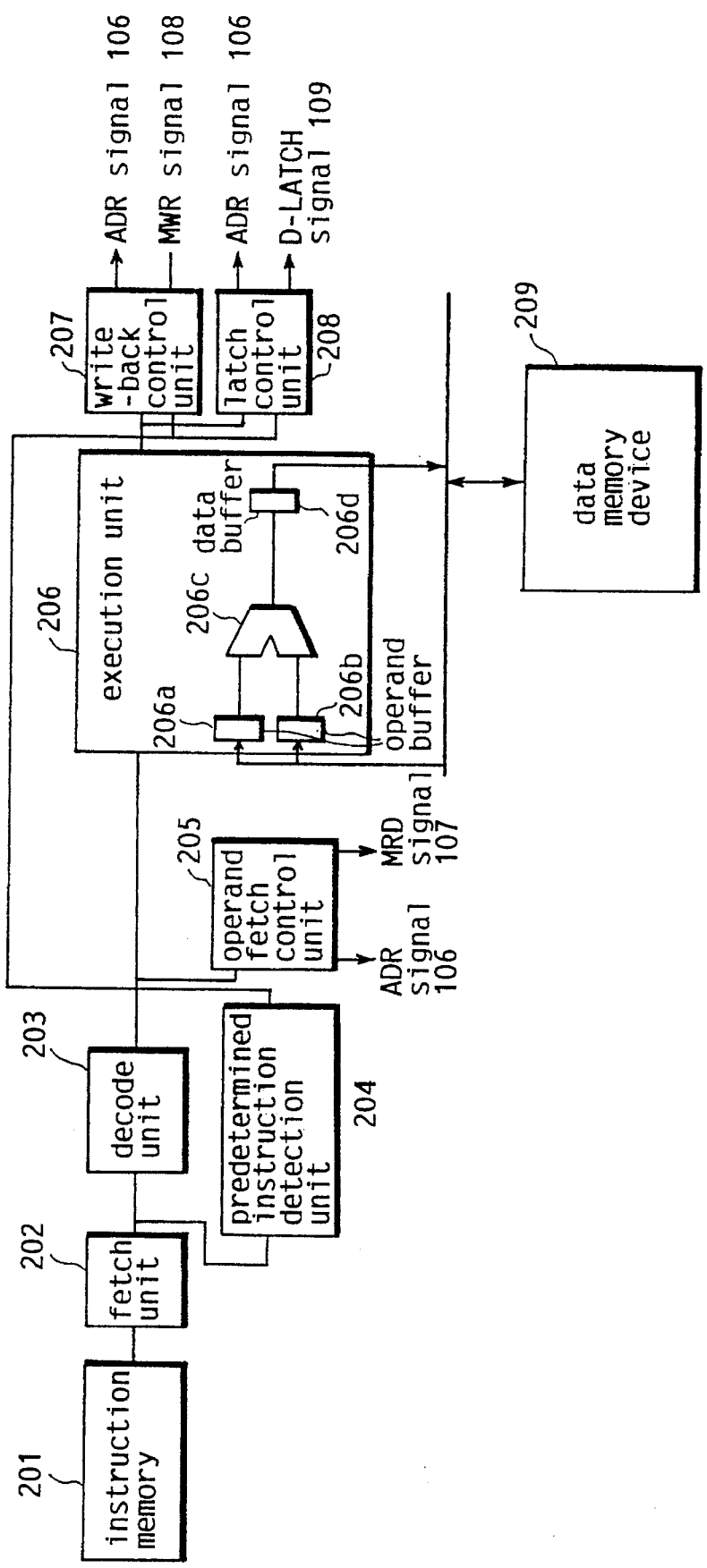
FIG. 2 is a block diagram depicting construction of a pipeline processor system comprising the memory device and a pipeline processor in the first embodiment.

The pipeline processor employing the data memory device in FIG. 1 implements a four-stage pipeline for instruction execution, consisting of a first instruction fetch stage (IF), a second decode/operand stage (DEC/OF), a third execute stage (EX), and a fourth write-back stage (WB). Now that construction of this pipeline processor will be described with reference to FIG. 2.

An instruction memory 201 holds instructions.

A fetch unit 202 fetches instructions from the instruction memory 201.

A decode unit 203 decodes the instructions fetched by the fetch unit 202.

A predetermined instruction detection unit 204 detects a first predetermined instruction or a second predetermined instruction as the fetched instruction enters in its DEC stage. The first predetermined instruction directs the latch of the data to the data latch 103 in its WB stage; and the second instruction directs the transfer of the data from the data latch 103 into the data memory 101.

An operand fetch control unit 205 fetches operand data from the data memory 101 or the register file (not illustrated) according to the decoding results of the decode unit 203.

An execution unit 206 performs the operation of the instruction decoded by the decode unit 203. The unit 206 further comprises operand buffers 206a and 206b each of which temporarily holds the operand data, an ALU (arithmetic and logic unit) 206c for manipulating the operand data, and a data buffer 206d for temporarily holding the operation results.

A write-back control unit 207 writes the operation results into the data memory 101 during the WB stage.

A latch control unit 208 has the data latch 103 latch the operation results via the data bus 102 if the predetermined instruction detection unit 204 detects the first predetermined instruction. The latch control unit 208 transfers the data from the data latch 103 into the data memory 101 via the buffer 104 if the predetermined instruction detection unit 204 detects the second predetermined instruction.

The construction of a data memory device 209 was described in the above with reference to FIG. 1, and will not be repeated.

Construction of the instruction will be described hereunder with reference to FIG. 3. The figure includes a general instruction (a), the first predetermined instruction (b), and the second predetermined instruction (c). The bits 31–25 represent the operation code; and the bits 24 and 23 represent the sort of the instruction. To be concrete, "00" at the bits 24 and 23 indicates the general instruction (a) and "01" indicates the first predetermined instruction or the second predetermined instruction. The bits 22–14 represent the two operand; and the bits 13–11 represent the operation of the data latch 103. To be concrete, "000" at the bits 13–11 indicates the transfer of the data from the data bus 102 into the data memory 101 via the data latch 103; 001" indicates the latch of the data to the data latch 103; and "010" indicates the transfer of the data from the data latch 103 into the data memory 101.

The constructions of the data memory device 209 and the pipeline processor have been described so far; now that operation of the data memory device 209 will be described hereunder in four memory accesses: case 1–4.

(Case 1)

Execution of the operand fetch (OF) will be described.

The instruction is fetched from the instruction memory 201 by the fetch unit 202 in its IF stage. The decode unit 203 decodes the instruction as it enters in the DEC/OF stage. If the source operand is detected in one of the instructions (a)–(c), the operand fetch control unit 205 outputs the ADR signal 106 and the MRD signal 107 to the data memory unit 209 so that the operand data are read according to the source. Subsequently, the operand data are outputted to the data bus 102 via the data buffer 105, and are stored into the operand buffer 206a.

The operation timing of the OF will be described with reference to FIG. 4. At the beginning of the clock cycle for the OF, the ADR signal 106 is inputted to the data memory 101. Concurrently, the MRD signal 107 is activated so that the operation mode of the data memory 101 is shifted into the data read mode. At the high level of the clock φ2, the data are read from the data memory 101 and are given to the data bus 102.

(Case 2)

The write-back of the data on the data bus 102 into the data memory 101 (WBM) within a clock cycle will be described.

In this case the destination of the operation results of the instruction (a) is designated. Fetched in the IF stage and decoded in the DEC/OF stage, the instruction is executed according to the OP code in its EX stage. The operation results are stored into the data memory 101 designated by its pointer.

Figure 5:
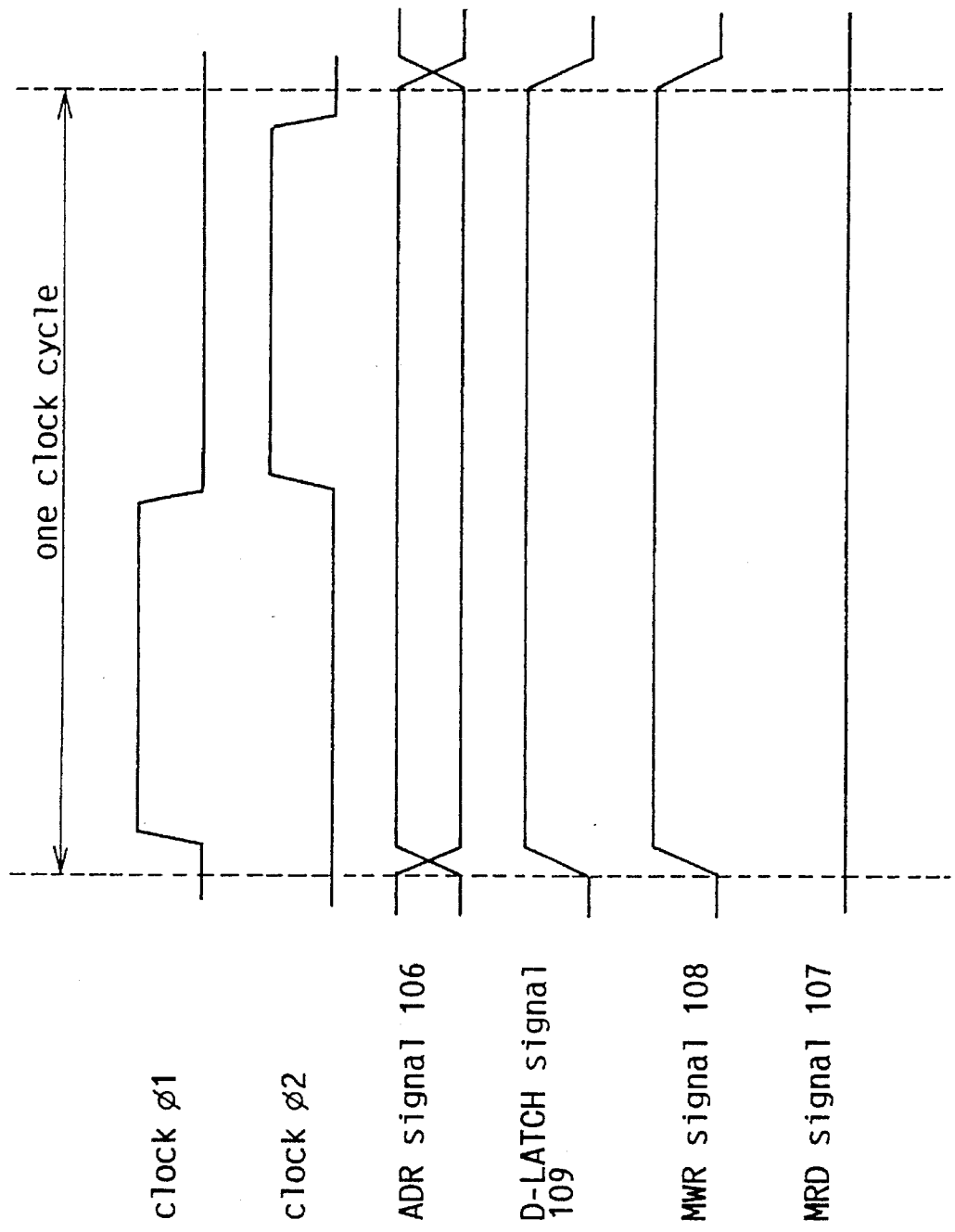
FIG. 5 shows the operation timing of memory write-back (WBM) in the first embodiment.

The operation timing of the WBM will be described with reference to FIG. 5. At the beginning of the clock cycle for the WBM, the ADR signal 106 is inputted to the data memory 101. Concurrently, the MWR signal 108 and the D-LATCH signal 109 are activated so that the operation mode of the data memory 101 is shifted into the data write mode. At the high level of the clock 110 (φ1), the output of the AND gate 111 is activated, so that the data on the data bus 102 are latched to the data latch 103, and are transferred to the data memory 101. At the end of the clock cycle, the data are written into the data memory 101.

(Case 3)

The latch of the data on the data bus 102 to the data latch 103 (WBL) will be described.

In this case the destination of the operation results designated by the second predetermined instruction (b) is the data latch 103. Fetched in the IF stage and decoded in the DEC/OF stage, the first predetermined (b) instruction is executed according to the OP code during the EX stage. Subsequently, the operation results are latched to the data latch 103.

Figure 6:
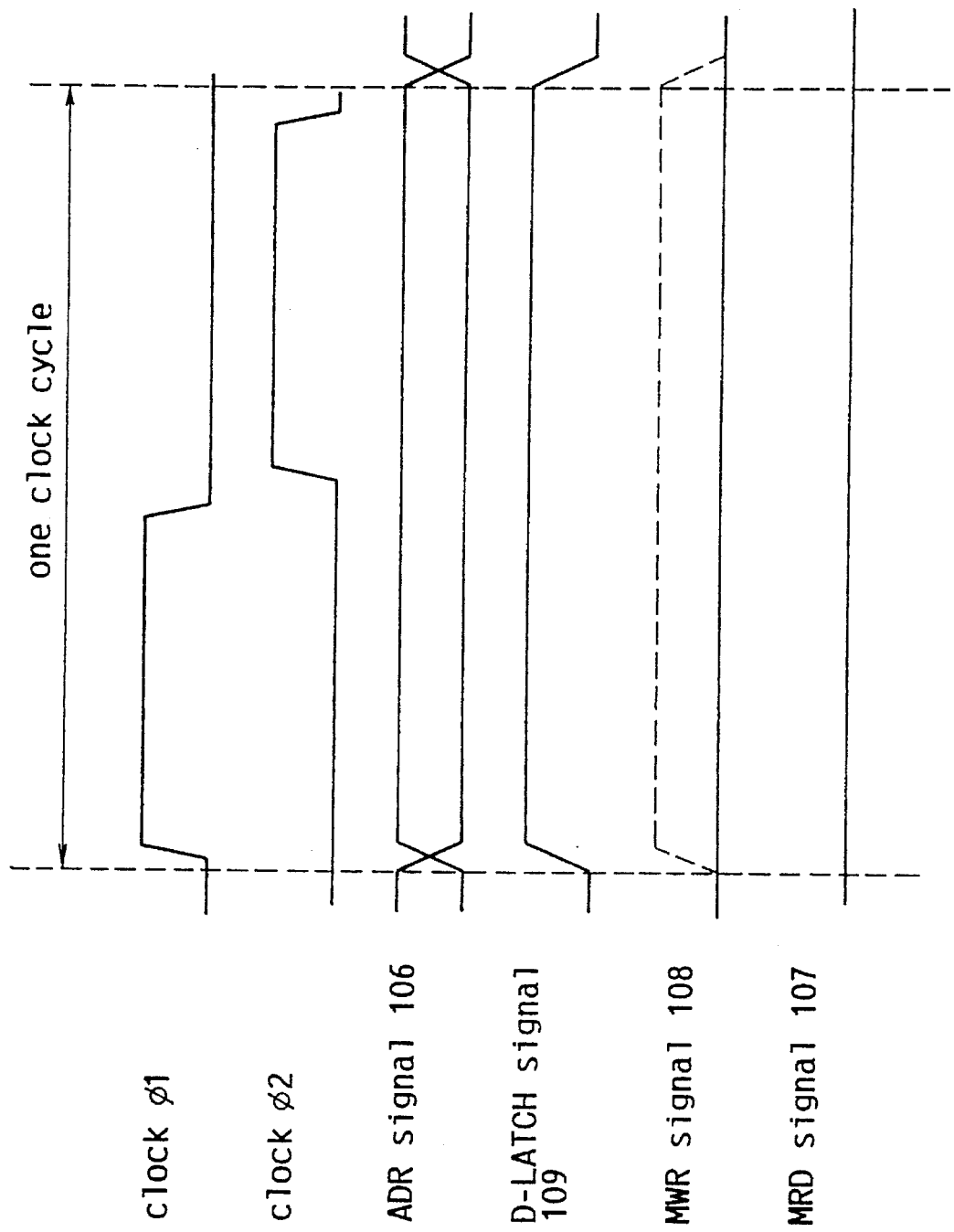
FIG. 6 shows the operation timing of memory read (WBL) in the first embodiment.

The operation timing of the WBL will be described with reference to FIG. 6. At the beginning of the clock cycle for the WBL, the ADR signal 106 is inputted to the data memory 101. Concurrently, the D-LATCH signal 109 is activated so that the data on the data bus 102 are latched to the data latch 103. In this case the MWR signal is inactive; therefore, the transfer of the data from the data latch 103 into the data memory 101 will not be performed; and the data which was latched from the data bus 102 stays in the data latch 103 at the end of the clock cycle.

(Case 4)

The write of the data at the data latch 103 into the data memory 101 (WLM) will be described.

In this case, the second predetermined instruction directs the transfer of the data from the data latch into the data memory 101, the data having been latched thereto according to the first predetermined instruction. The second predetermined instruction is fetched in its IF stage; decoded in its DEC/OF stage; and executed according to the OP code in its EX stage. Subsequently, the data at the data latch 103 are transferred to the data memory 101. To be noted, the data at the data latch 103 are independent from the operation results obtained in the EX stage of the second predetermined instruction. That is, the second predetermined instruction includes the output of the data from the data latch 103 as well as the execution of the instruction placing after the first predetermined instruction and excluding its own memory access.

Figure 7:
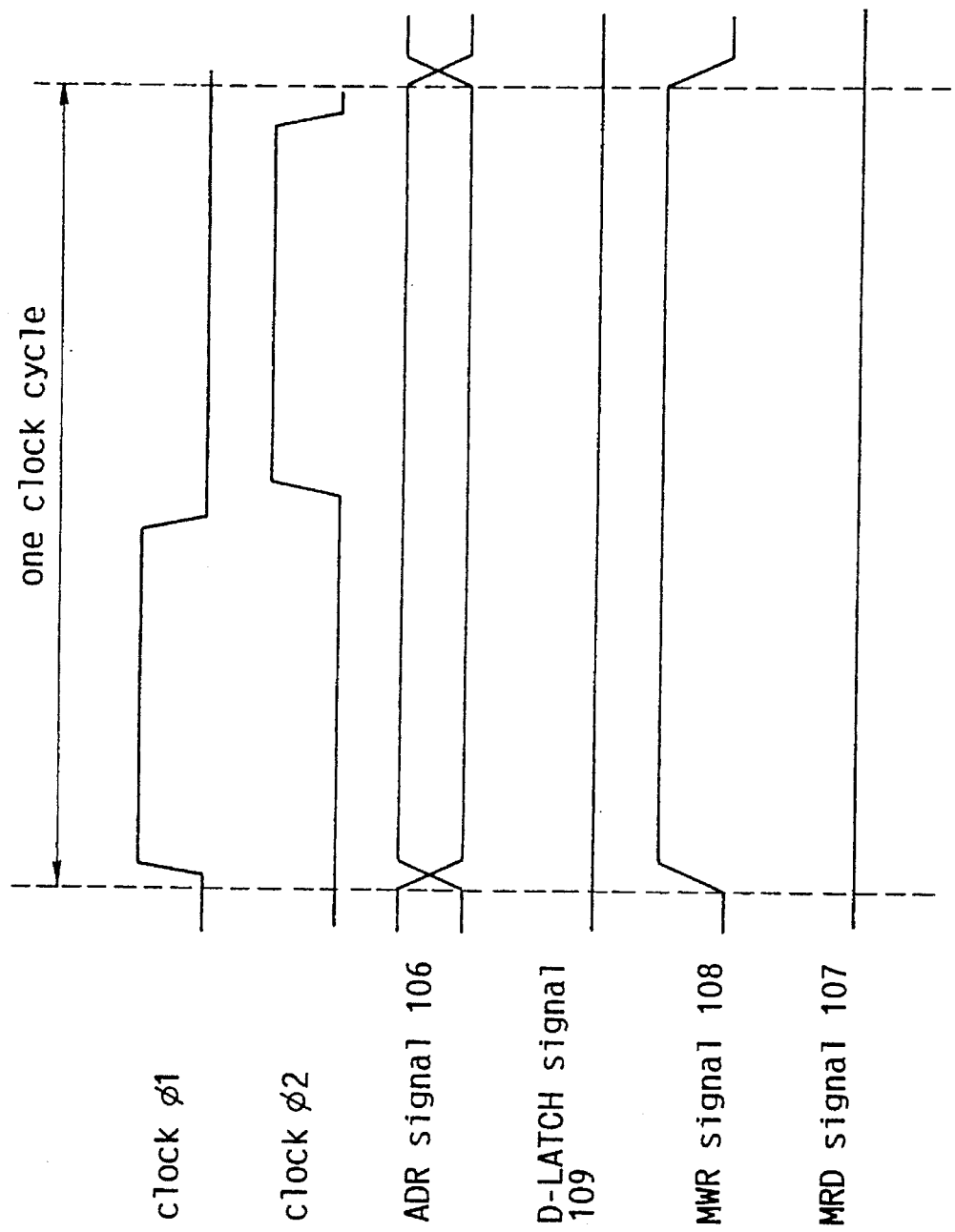
FIG. 7 shows the operation timing of memory read (WLM) in the first embodiment.

The operation timing of the WLM will be described with reference to FIG. 7. At the beginning of the clock cycle for the WLM, the ADR signal 106 is inputted to the data memory 101. Concurrently, the MWR signal 108 is activated so that the data at the data latch 103 are transferred into the data memory 101 via the buffer 104. Thus, at the end of the clock cycle, the data which were latched to the data latch 103 will be transferred into the data memory 101.

The stall in the pipeline will be prevented when a program manipulates the above four memory accesses to the data memory device 209 (cases 1–4)

Figure 8:
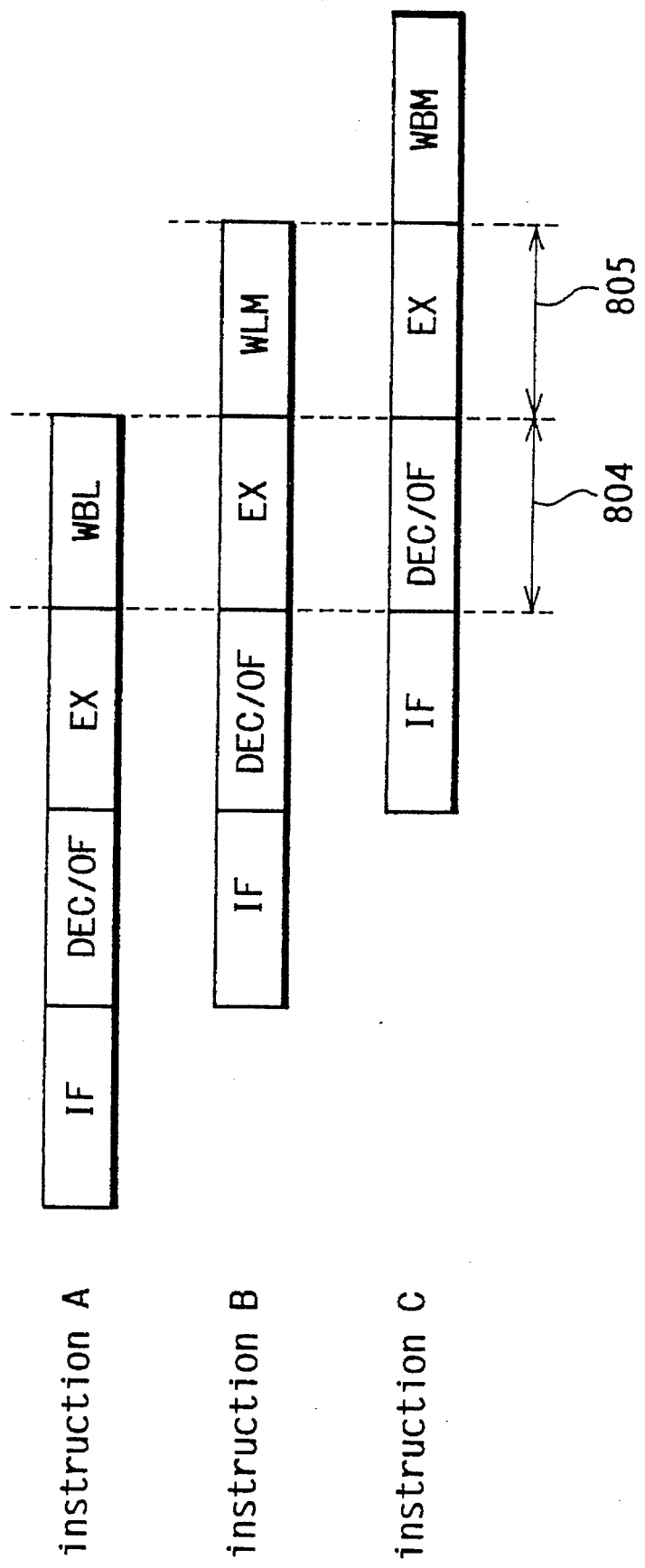
FIG. 8 is a program excluding resource conflicts in the first embodiment.

The program in FIG. 8 consists of instruction A [the first predetermined instruction (b)], instruction B [the second predetermined instruction (c)], and instruction C [the general instruction (a)]. The program is designed to have the instructions A–C overlapped in their execution stages. The execution at each of the OF, WBM, WBL, WLM has been described in the case 1, 2, 3, 4 respectively; and in FIG. 8 both the D-LATCH signal 109 and the MRD signal 107 are active at the OF and WB.

During the clock cycle 804, the instruction A is in its WBL stage while the instruction C is in its DEC/OF stage. That is, the instruction A directs the latch of the data to the data latch 103; and the instruction C directs the read of the operand data from the data memory 101. Thus, the data memory 101 is in the memory read mode in the clock cycle 804.

During the clock cycle 805, the instruction B is in its WLM stage. That is, the instruction B directs the transfer of the data from the data latch 103 into the data memory 101.

Thus, owing to the instructions A and B, the stall in the pipeline conventionally caused by the resource conflicts can be prevented. When two memory accesses (instruction in its WB stage and instruction in its OF stage) compete for the data memory 101 in a clock cycle, the preceding instruction in its WB stage is made the first predetermined instruction, and hence the data are latched to the data latch 103. An instruction which will be executed after the first predetermined and excludes its own memory access, on the other hand, is made the second predetermined instruction, and hence the data which were latched to the data latch 103 are written into the data memory 101. Consequently, the stall in the pipeline is eliminated, and hence the conventional performance delay will be prevented.

The second predetermined instruction can place anywhere between the first determined instruction and an instruction including the write access to the data memory 101, although it follows right after the first predetermined instruction in the above. That is, according to the first predetermined instruction, the data to be written into the data memory 101 will be stored into the data latch 103 until the transfer thereof is directed by the second predetermined instruction. Thus, the second predetermined instruction includes the transfer of the data from the data latch 103 into the data memory 101 as well as the execution of the instruction excluding its own memory access.

Embodiment 2

Construction of a data memory device employed by a pipeline processor will be described hereunder with reference to FIG. 9, in which like components are labeled with like reference numerals with respect to the first embodiment, and the description of these components is not repeated.

A data latch 701 temporarily holds data received from the data memory 101.

An AND gate 702 computes the AND of the MRD signal 107 with the clock φ2; and provides a data latch signal to the data latch 701.

An AND gate 704 computes the AND of a latch data output signal 703 with the clock φ2; and provides an output control signal to the buffer 105.

A buffer 705 computes the AND of the MWR signal 108 with the clock φ1; and provides an output control signal to the buffer 104.

The latch data output (L-OUT) signal 703 controls the transfer of the data at the data latch 103 to the data bus 102 via the buffer 105.

The processor employing the data memory device in FIG. 9 implements the same four-stage pipeline as in the first embodiment; and now construction of the pipeline processor will be described with reference to FIG. 10, in which like components are labeled with like reference numerals with respect to the first embodiment.

A predetermined instruction detection unit 901 detects a third predetermined instruction or a fourth predetermined instruction as the fetched instruction enters in its DEC stage. The third predetermined instruction directs the latch of the data to the data latch 701 in its DEC/OF stage. The fourth predetermined instruction directs the read of the data from the data latch 701.

A latch control unit 902 has the data latch 701 latch the operand data from the data memory 101 if the predetermined instruction detection unit 901 detects the third predetermined instruction. The latch control unit 902 reads the data from the data latch 701 via the buffer 105 if the predetermined instruction detection unit 901 detects the fourth predetermined instruction.

Figure 9:
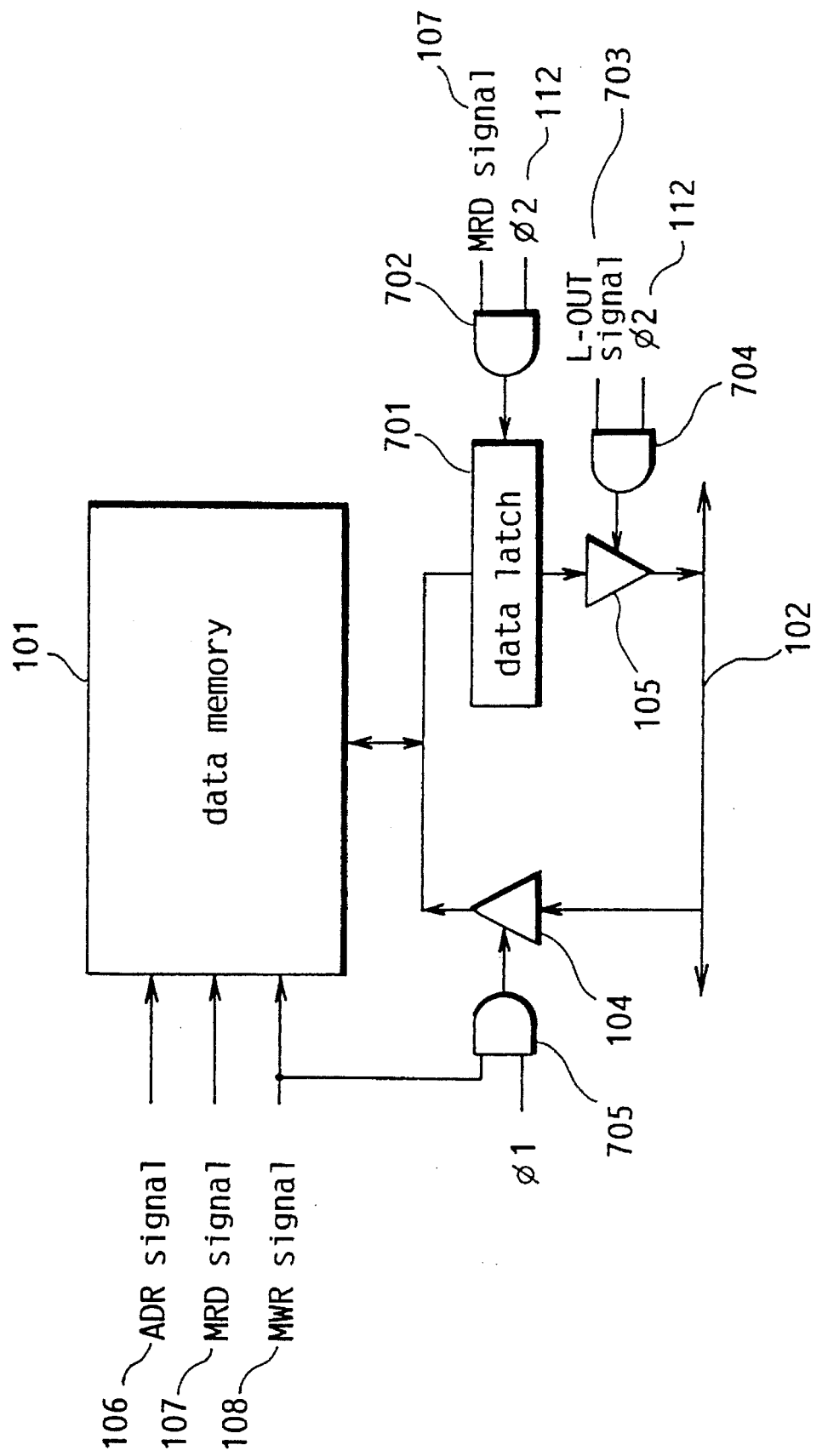
FIG. 9 a block diagram depicting construction of a memory device in a second embodiment of the present invention.
Figure 10:
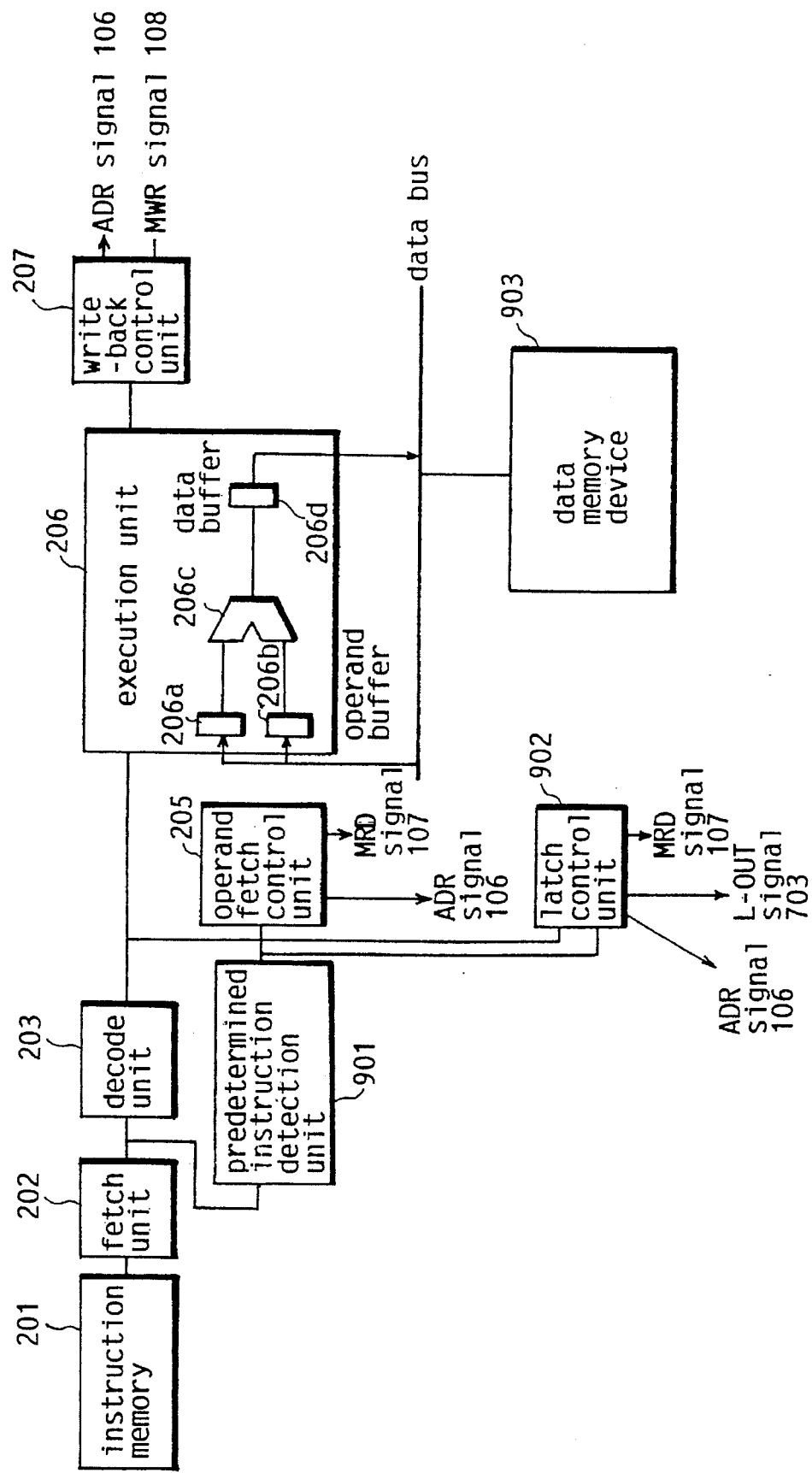
FIG. 10 is a block diagram depicting construction of a pipeline processor system comprising the memory device and a pipeline processor in the second embodiment.

The construction of a data memory device 903 was described in the above with reference to FIG. 9, and will not be repeated.

Construction of the instructions will be described with reference to FIG. 11. The instructions employed in this embodiment are substantially same as the instructions in the first embodiment, and hence only the difference will be described. The figure includes the general instruction (a), the third predetermined instruction (b), and the fourth predetermined instruction (c). The bits 13–11 represent the operation code. To be concrete, "000" at the bits 13–11 indicates the read of the data from the data memory 101 via the data latch 701; "101" indicates the latch of the data to the data latch 701; and "110" indicates the read of the data from the data latch 701.

The constructions of the data memory device 903 and the pipeline processor have been described so far; now that operation of the data memory device 903 will be described hereunder in four memory accesses: case 5–8.

(Case 5)

The write of the data on the data bus 102 into the data memory 101 (WM) will be described.

In this case the destination of the operation results obtained in the EX stage is designated by the general instruction (a).

The operation timing of the WM will be described with reference to FIG. 12. At the beginning of the clock cycle for the WM, the ADR signal 106 is inputted to the data memory 101. Concurrently, the MWR signal 108 is activated so that the operation mode of the data memory 101 is shifted into the data write mode. At the high level of the clock φ1, the data at the data bus 102 are outputted to the data memory 101 via the buffer 104. At the end of the clock cycle for the WM, the data outputted from the data bus 102 will be written into the data memory 101.

(Case 6)

The operand fetch from the data memory 101 (OF) in a clock cycle will be described.

In this case the source of the data in the data memory 101 is designated by the instruction (a).

Figure 13:
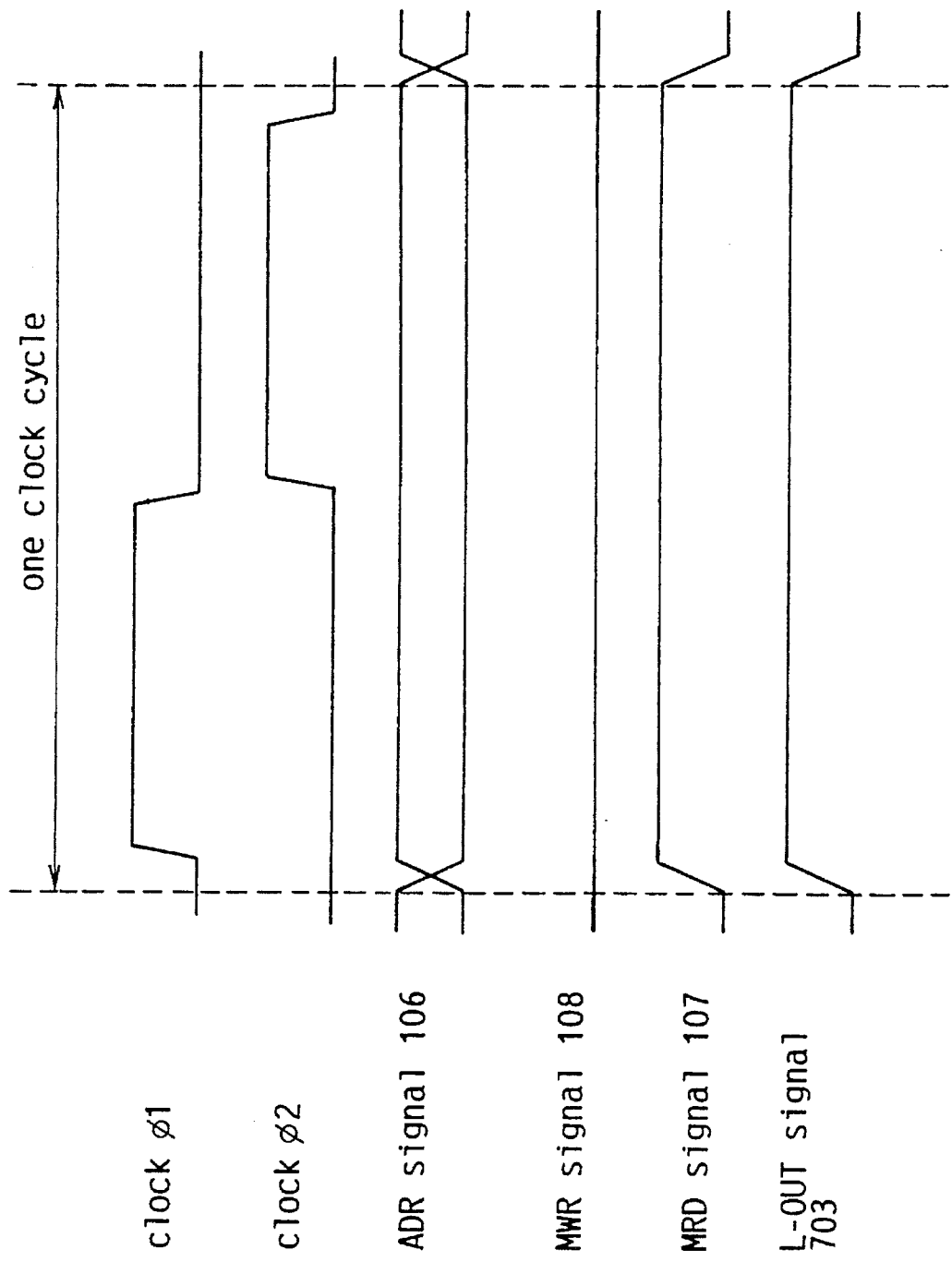
FIG. 13 shows the operation timings of memory write-back (WBM) in the second embodiment.
Figure 14:
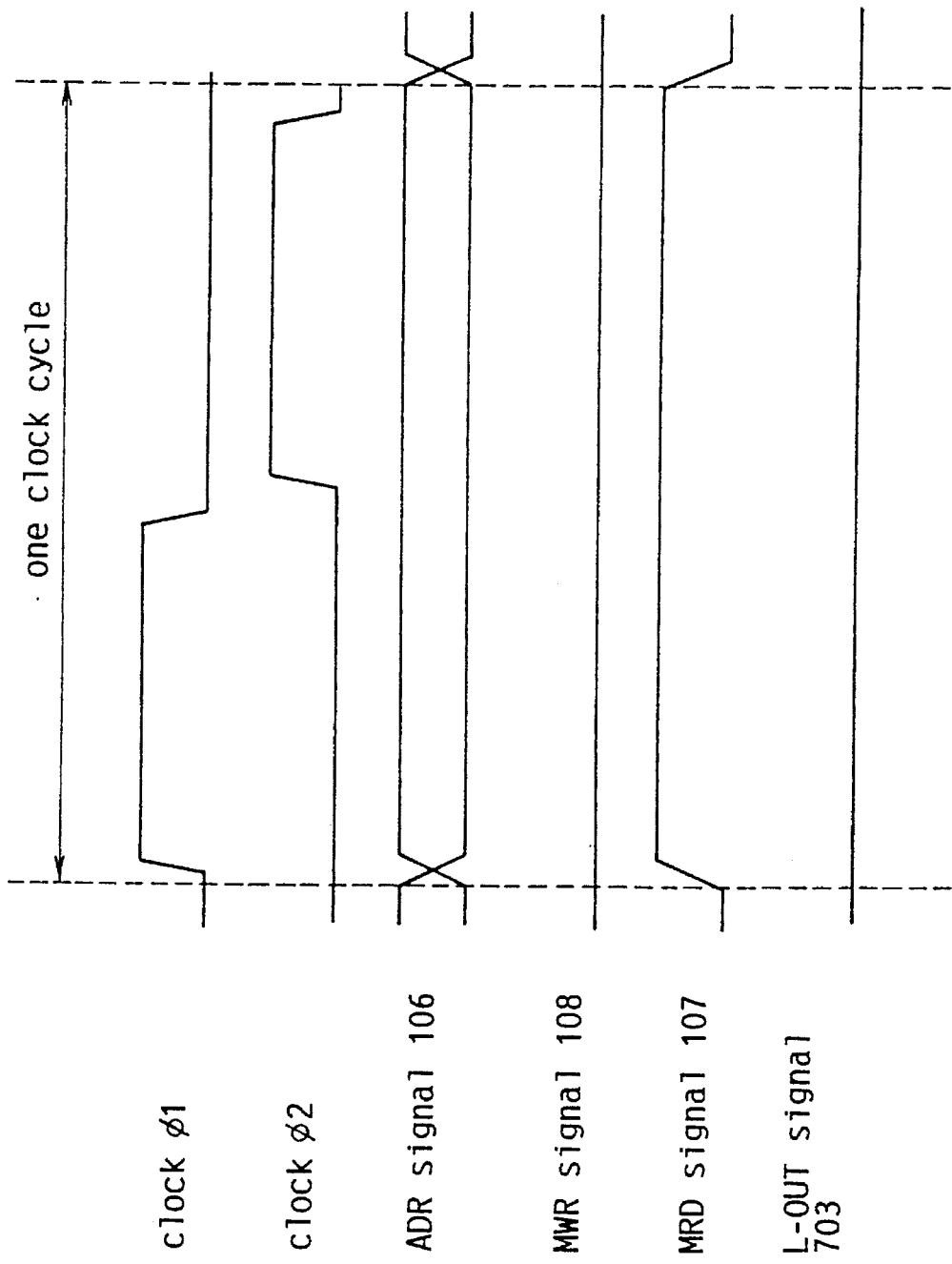
FIG. 14 shows the operation timing of memory read (WBL) in the second embodiment.

The operation timing of the OF will be described with reference to FIG. 13. At the beginning of the clock cycle for the OF, the ADR signal 106 is inputted to the data memory 101. Concurrently, the MRD signal 107 is activated so that the operation mode of the data memory 101 is shifted into the memory read mode. Also the L-OUT signal 703 is activated so that the output of the AND gate 111 is activated at the high level of the clock φ2. Consequently, the data are outputted from the data memory 101 to the data bus 102 via the buffer 105.

(Case 7)

The latch of the data from the data memory 101 to the data latch 701 (RML) will be described.

In this case the third predetermined instruction directs the operand fetch for the fourth predetermined instruction and the latch thereof to the data latch 701. The fourth predetermined instruction places right after the third predetermined instruction.

To be noted, the third predetermined instruction includes the read of the data from the data latch 701 and execution of an instruction placing before the fourth predetermined instruction and excluding its own memory access.

The operation timing of the RML will be described with reference to FIG. 13. At the beginning of the clock cycle for the RML, the ADR signal 106 is inputted to the data memory 101. Concurrently, the MRD signal 107 is activated so that the operation mode of the data memory 101 is shifted into the memory read mode. Subsequently, the output of the AND gate 702 is activated at the high level of the clock φ2, so that the data are read from the data memory 101 and are latched to the data latch 701. In this case the L-OUT signal is inactive, so that the data at the data latch 701 will not be transferred to the data bus 102.

(Case 8)

The transfer of the data from the data latch 701 into the data bus 102 (RLB) will be described.

In this case the fourth predetermined instruction directs the transfer of the data from the data latch 701 into the data bus 102, the data having been latched thereto according to the third predetermined instruction.

Figure 15:
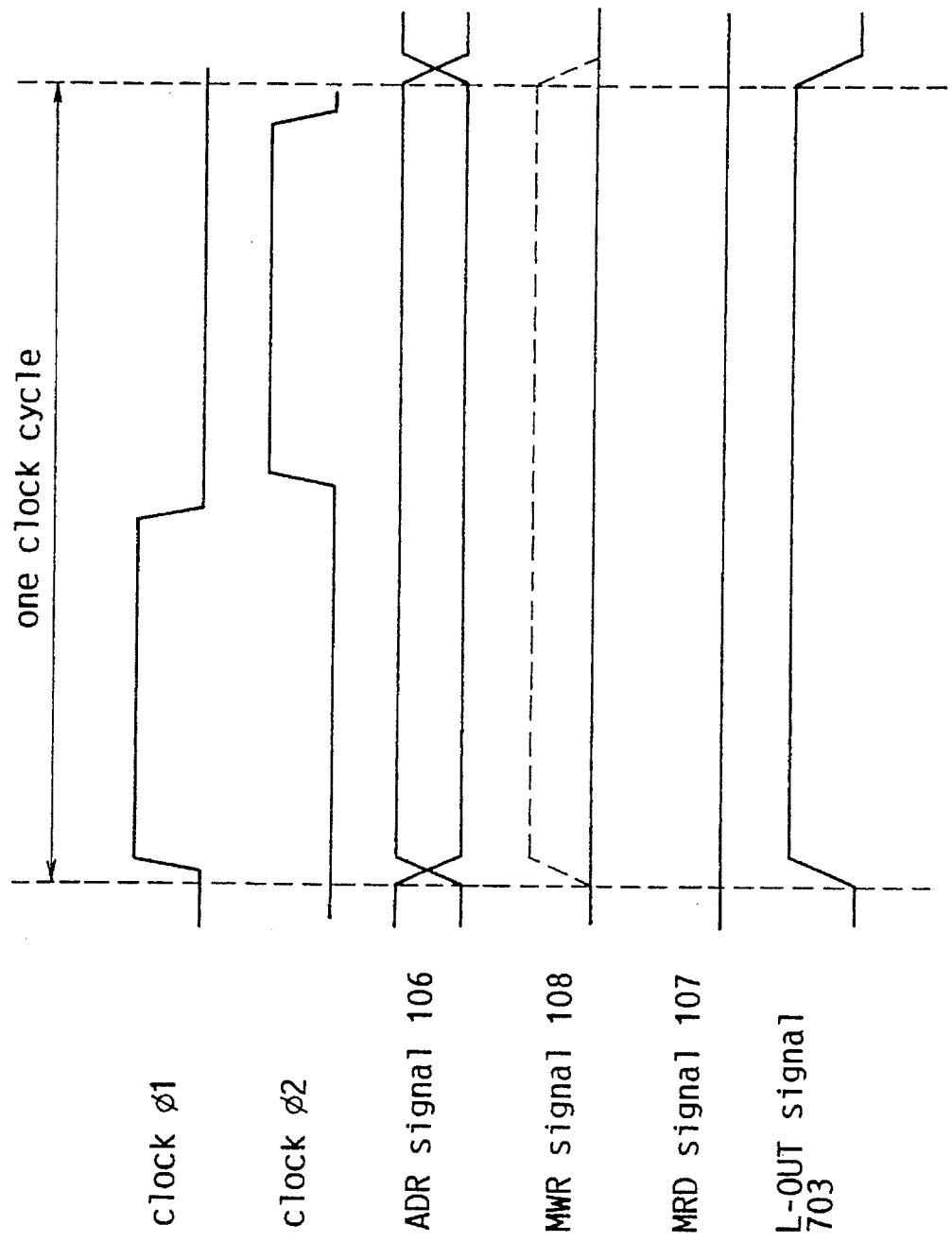
FIG. 15 shows the operation timing of memory read (WLM) in the second embodiment.

The operation timing of the RLB will be described with reference to FIG. 15. At the beginning of the clock cycle for the RLB, the L-OUT signal 703 is activated so that the output of the AND gate 704 is activated at the high level of the clock φ2. Consequently, the data at the data latch 701 are transferred to the data bus 102 via the buffer 105.

The stall in the pipeline will be prevented when a program manipulates the above four memory accesses to the data memory device 209 (case 5–8).

Figure 16:
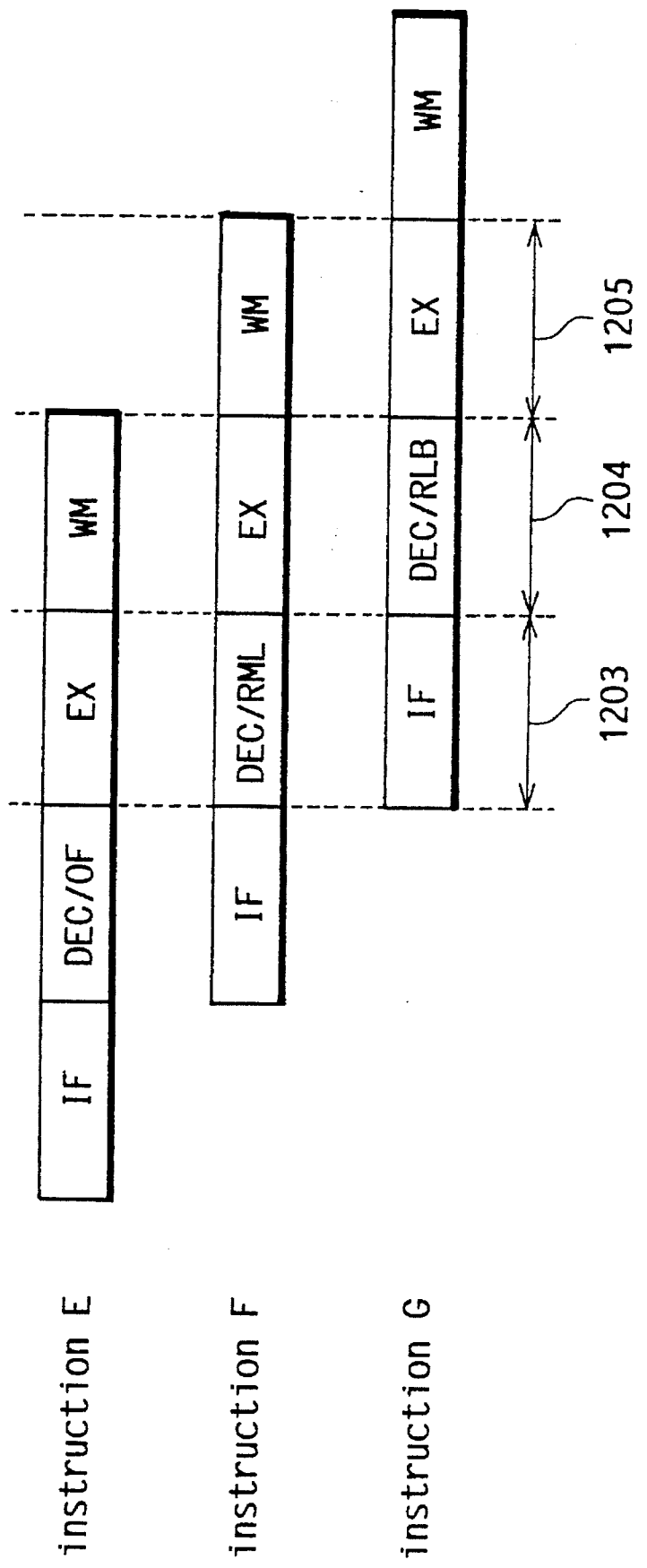
FIG. 16 is a program excluding resource conflicts in the second embodiment.

The program in FIG. 16 consists of instruction E [the general instruction (a)], instruction F [the third predetermined instruction (b)], and instruction G [the fourth predetermined instruction (c)]. The program is designed to have the instructions E–G overlapped in their execution stages.

The execution at each of the WM, OF, RML, RLB has been described in the case 5, 6, 7, 8 respectively; and in FIG. 16 both the MRD signal 107 and the L-OUT signal 703 are active at the WM and the RLB.

During the clock cycle 1203, the instruction F is in its RML stage. That is, the instruction F directs the latch of the data to the data latch 703. The data latched thereto include the operand data for the fourth predetermined instruction.

During the clock cycle 1204, the instruction E is in its WM stage while the instruction G is in its RLB stage. That is, the instruction E directs the write of the operation results into the data memory 101; and the instruction G directs the transfer of the data from the data latch 703 into the data bus 102.

Thus, owing to the instructions F and G, the stall in the pipeline conventionally caused by the resource conflicts can be prevented. When two memory accesses (instruction in its WM stage and instruction in its OF stage) compete for the data memory 101 in a clock cycle, the instruction which places before the fourth predetermined instruction and excludes its own operand fetch is made the third predetermined instruction. Therefore, the operand data of the fourth predetermined instruction are latched to the data latch 703. Subsequently, according to the fourth predetermined instruction, the operand data are read from the data latch 703. Thus, the stall in the pipeline is eliminated, and hence the conventional performance delay will be prevented.

The third predetermined instruction can place anywhere before the fourth predetermined instruction unless another operand fetch access to the data memory 101 places between them; although the third predetermined instruction places right before the fourth predetermined instruction in the above. The third instruction includes the latch of the data from the data memory 101 to the data latch 703 and execution of an instruction which excludes its own memory access. The operand data which were latched according to the third predetermined instruction will stay in the data latch 703 until the read thereof is directed by the fourth predetermined instruction.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A pipeline processor system comprising:

a first predetermined instruction;

a second predetermined instruction;

a memory device of the pipeline processor for storing data and/or instructions, and for latching data of the first predetermined instruction, which requires the data to be written to or read from the memory device, the latching being performed concurrently with either a memory read operation or a memory write operation required by a subsequent instruction;

an instruction detection means for detecting from fetched instructions the first predetermined instruction which instructs latching of the data, the first predetermined instruction including the data which is to be written to or read from the memory device, as well as for detecting the second predetermined instruction which instructs outputting of the latched data after performance of the memory write operation required by the subsequent instruction; and a latch control means for directing the latching of the data, instead of directing the writing of the data to or the reading of the data from the memory device, when the first predetermined instruction is detected, as well as for directing the outputting of the latched data when the second predetermined instruction is determined, the second instruction being detected before detection of the subsequent instruction.

2. The pipeline processor system of claim 1, wherein the memory device holds only data, and an instruction memory device independent from the memory device holds only instructions.

3. The pipeline processor system of claim 1, wherein the first predetermined instruction includes either of two possible memory accesses replaced with a latch operation, such that a latch operation is instructed instead of one of the two possible memory accesses, the two memory accesses having been planned in one clock cycle; and the second predetermined instruction includes execution of an instruction and an output, the instruction being placed after the first predetermined instruction and itself not having a memory access.

4. The pipeline processor system of claim 1, wherein the first predetermined instruction includes execution of an instruction and an output, the instruction being placed after the first predetermined instruction and itself not having a memory access; and the second predetermined instruction includes either of two memory accesses replaced with a latch, the two memory accesses having been planned in one clock cycle.

5. A pipeline processor system comprising a pipeline processor, a first predetermined instruction, a second predetermined instruction and a memory device, the memory device comprising:

a memory means for holding data and/or instructions, as well as for being accessed to implement either a memory read operation or a memory write operation in a clock cycle; and a data latch means for latching data of the first predetermined instruction, which requires the data to be written into the memory means; the pipeline processor comprising:

an instruction detection means for detecting from fetched instructions the first predetermined instruction which instructs latching of the data to be written into the memory means as well as the second predetermined instruction which instructs writing of the latched data into the memory means after a memory access is performed by a third predetermined instruction, the latching operation occurring while the third predetermined instruction performs the memory access; and a latch control means for directing latching of operation results of the first predetermined instruction when the first predetermined instruction is detected by the instruction detection means, and for directing writing of the latched data into the memory means when the second predetermined instruction is detected.

6. The pipeline processor system of claim 5, wherein the first predetermined instruction includes an operand fetch from the memory means replaced with a latch of the operand, the operand fetch encompassing two memory accesses having been planned in a clock cycle together with the memory write operation; and the second predetermined instruction includes execution of an instruction and writing of the latched data into the memory means, the instruction being placed after the first predetermined instruction and not itself having a memory access.

7. The pipeline processor system of claim 5, wherein the memory device is connected to the pipeline processor via a data bus;

the data latch means is connected so that data are inputted from the data bus and are outputted to the memory means; and the latch control means directs reading of the data from the memory means during a memory read cycle as well as latching of the data at the data bus to the data latch means during a first half of the same memory read cycle.

8. The pipeline processor system of claim 5, wherein the pipeline processor includes an instruction fetch stage, a decode/operand fetch stage, an execute stage, and a write-back stage;

the first predetermined instruction instructs latching of the data instead of writing of the data into the memory means in its write-back stage when the memory write operation and the operand fetch from the memory means are planned in a clock cycle;

the second predetermined instruction includes execution of an instruction and writing of the latched data into the memory means, the instruction itself not having a write-back stage; and the latch control means directs latching of operation results of the first predetermined instruction to the data latch means during its write-back stage as well as directing writing of the latched data into the memory means during the write-back stage of the second predetermined instruction.

9. The pipeline processor system of claim 5, wherein both the first predetermined instruction and the second predetermined instruction have a unique bit pattern formed at a predetermined location in their machine language instructions; and the instruction detection means detects the first predetermined instruction and the second predetermined instruction by decoding the bit patterns at the respective predetermined locations in the machine language locations.

10. The pipeline processor system of claim 9, wherein the second predetermined instruction has in its machine language instruction a predetermined field for indicating a destination address of operation results of the first predetermined instruction; and the instruction detection means obtains the destination address by decoding the predetermined field in the machine language instruction when detecting the second predetermined instruction.

11. A pipeline processor system comprising a pipeline processor, a first predetermined instruction, a second predetermined instruction and a memory device for holding data applied to the processor, the memory device comprising:

memory means for holding data and/or an instruction, as well as being accessed to implement either a memory read operation or a memory write operation in a clock cycle; and data latch means for latching data of the first predetermined instruction, which requires the data to be read form the memory means; the pipeline processor comprising:

instruction detection means for detecting from fetched instructions the first predetermined instruction which instructs latching of the data to be read from the memory means to the data latch means as well as the second predetermined instruction which instructs outputting of the latched data after a memory access is performed by a third predetermined instruction, the latching operation occurring while the third predetermined instruction performs the memory access; and latch control means for directing the latching of data from the memory means to the data latch means when the first predetermined instruction is detected by the instruction detection means, the data being located at an address designated by the detected instruction, as well as for directing the reading of the latched data when the second predetermined instruction is detected.

12. The pipeline processor system of claim 11, wherein the first predetermined instruction includes execution of an instruction and latching of the data from the memory means to the data latch means, the instruction being placed before the second predetermined instruction and itself not having an operand fetch; while the second predetermined instruction includes the memory read operation replaced with a read of the latch means, the memory read operation encompassing two memory accesses having been planned in a clock cycle together with the memory write operation.

13. The pipeline processor system of claim 11, wherein the memory device is connected to the pipeline processor via a data bus;

the data latch means is connected so that data are inputted from the data bus and are outputted to the memory means; and the latch control means directs the reading of the data from the memory means during a memory read cycle as well as the latching of the data at the data bus to the data latch means during a first half of the same memory read cycle.

14. The pipeline processor system of claim 11, wherein the pipeline processor includes an instruction fetch stage, a decode/operand fetch stage, an execute stage, and a write-back stage;

the first predetermined instruction instructs latching of data to the data latch means during the decode/operand fetch stage of an instruction, the instruction itself not having an operand fetch, while the second predetermine instruction instructs outputting of the latched data during its decode/operand fetch stage when an operand fetch of another instruction and a write-back of the second predetermined instruction are planned in a clock cycle, and the latch control means directs the latching of the data to the data latch means during the decode/operand fetch stage of the first predetermined instruction as well as directing the reading from the data latch means during the decode/operand fetch stage of the second predetermined instruction.

15. The pipeline processor system of claim 11, wherein both the first predetermined instruction and the second predetermined instruction have a unique bit pattern formed at a predetermined location in their machine language instructions; and the instruction detection means detects the first predetermined instruction and the second predetermined instruction by decoding the bit patterns at the respective predetermined locations in the machine language instructions.

16. The pipeline processor system of claim 15, wherein the second predetermined instruction has in its machine language instruction a predetermined field for indicating a destination address of operation results of the first predetermined instruction; and the instruction detection means obtains the destination address by decoding the predetermined field in the machine language instruction when detecting the second predetermined instruction.

17. A pipeline processor system for preventing a write-back stage of a first instruction and an operand-fetch stage of a third instruction from simultaneously attempting a memory access, the pipeline processor system comprising:

means for detecting the first instruction, and for directing data in the first instruction that requires a memory access to be written to a latch during the write-back stage of the first instruction; and means for detecting a second instruction, and for directing the memory access which was required by the latched data to be performed during a write-back stage of the second instruction, the operand-fetch stage of the third instruction accessing the memory when the write-back stage of the first instruction writes the data to the latch, a memory access subsequently being performed for the latched data during execution of the write-back stage of the second instruction.

* * * * *